(12) United States Patent
Inagaki et al.

(10) Patent No.: US 8,351,105 B2
(45) Date of Patent: Jan. 8, 2013

(54) COLOR TONE VARIABLE FILM, METHOD OF MANUFACTURING THE SAME, AND ELECTROCHROMIC ELEMENT OBTAINED BY THE MANUFACTURING METHOD

(75) Inventors: Yoshio Inagaki, Ashigarakami-gun (JP); Shinichi Morishima, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 106 days.

(21) Appl. No.: 13/071,091

(22) Filed: Mar. 24, 2011

(65) Prior Publication Data
US 2011/0242637 A1 Oct. 6, 2011

(30) Foreign Application Priority Data
Mar. 31, 2010 (JP) ................. 2010-081841

(51) Int. Cl.
G02F 1/15 (2006.01)
G02F 1/07 (2006.01)
G02B 5/23 (2006.01)
(52) U.S. Cl. .............. 359/265; 359/241; 252/586
(58) Field of Classification Search .......... 156/60; 252/586; 359/240, 241, 265, 288, 321; 427/162
See application file for complete search history.

(56) References Cited

U.S. PATENT DOCUMENTS
2005/0084660 A1* 4/2005 Kojima et al. ............ 428/209

FOREIGN PATENT DOCUMENTS
JP 60-200235 A 10/1985

OTHER PUBLICATIONS

A. Hagfeldt et al., "Fast Electrochromic Switching with Nanocrystalline Oxide Semiconductor Films," J. Electrochem. Soc., vol. 141, No. 7, Jul. 1994, L82-L84.
G. Inzelt et al., "Electrochemistry and Electron Spin Resonance of Tetracyanoquinodimethane Modified Electrodes. Evidence for Mixed-Valence Radical Anions in the Reduction Process," J. Phys. Chem., vol. 87, No. 23, 1983, pp. 4592-4598.
Y. Zheng et al., "Synthesis and characterization of a novel kind of near-infrared electrochromic polymers containing an anthraquinone imide group and ionic moieties," Journal of Materials Chemistry, vol. 19, Oct. 1, 2009, pp. 8470-8477.
G. Inzelt et al., "Spectroelectrochemistry of Tetracyanoquinodimethane Modified Electrodes," J. Electroanal. Chem., vol. 161, 1984, pp. 147-161.

* cited by examiner

*Primary Examiner* — David N Spector
(74) *Attorney, Agent, or Firm* — Sughrue Mion, PLLC

(57) ABSTRACT

The present invention provides a color tone variable film which is formed by a reaction of a cationic polymer containing a structural unit containing a positive ionic group in a side chain and a compound containing an acid group and a partial structure which can change color tone as a result of energy application, which can be formed by a wet method, which has flexibility and strength in practical use, and which changes color tone with high sensitivity as a result of energy application, a simple manufacturing method thereof, and an electrochromic element obtained by the manufacturing method.

15 Claims, 4 Drawing Sheets

COLOR TONE VARIABLE FILM, METHOD OF MANUFACTURING THE SAME, AND ELECTROCHROMIC ELEMENT OBTAINED BY THE MANUFACTURING METHOD

CROSS-REFERENCE TO RELATED APPLICATION

This application claims priority under 35 USC 119 from Japanese Patent Application No. 2010-081841, filed on Mar. 31, 2010, the disclosure of which is incorporated by reference herein.

BACKGROUND OF THE INVENTION

1. Field of the Invention

The present invention relates to a color tone variable film, a method for manufacturing the same, and a chromic element obtained by the manufacturing method. More specifically, the invention relates to a color tone variable film that contains various kinds of color tone variable compounds, such as an electrochromic coloring material or a photochromic coloring material, and changes color tone by energy application, a simple manufacturing method therefor, and a chromic element obtained using such a manufacturing method.

2. Description of the Related Art

As a use of chromic materials, shading materials, such as display elements, information recording materials, and concentration variable sunglasses are known. In recent years, however, the possibility of a new use, such as electronic paper, has been found as a use of electrochromic materials. Thus, a structure which is flexible in addition to quickly changing color tone at a low voltage has been required instead of a structure that is hard and slowly changes color tone, such as shading glass.

The application of such materials in which the hue variously changes by energy application has been attempted. However, for manufacturing a color tone variable film with known conventional compounds, a vapor phase method using a vacuum deposition facility has been commonly used. Thus, a technique by which the color tone variable film can be simply manufactured at low cost without using such a device has been desired. On the other hand, a color tone variable film has been formed by applying a chromic compound as a solution and drying the same. However, particularly in the case of polymer compounds, the solubility in a solvent is low, and the degree of freedom of molecular design is limited in many cases. Therefore, a technique by which a poorly soluble film can be finally formed even when compounds with high solubility are used has been desired.

From the viewpoint of portability, a drive voltage for changing the color tone is preferably lower. For example, in the case of electrochromic materials, driving at 3 V or lower by the electrodeposition of silver or bismuth has been reported (e.g., K. Shinozaki, SID'02 Digest, 39-41 (2002)). Furthermore, in an example in which a viologen derivative that is reduced to nanocrystalline titanium dioxide and develops color is adsorbed, driving at 1.2 V has been reported (e.g., A. Hagfeldt, N. Vlachopopulos, and M. Gratzel, J. Electrochem. Soc., 141, L82-L84 (1994)).

It is considered that the use of a tetracyanoquinodimethane (TCNQ) derivative that is more easily reduced than viologen or anthraquinone imide can achieve driving at a lower potential. An electrochromic material containing an anion radical of TCNQ is known. However, an electrochromic polymer having a TTF (tetrathiafluvalene) skeleton as the main component changes color by oxidation-reduction, and the anion radical of TCNQ which is a chemical species in which the TCNQ has been already reduced simply has had a function of assisting the color change of TTF. In contrast, an electrochromic element using the electrochromism of the TCNQ itself is disclosed, but vapor deposition is used for the film formation of TCNQ, whereby the manufacturing cost is high, and the electrochromic element is not suitable for flexible uses (e.g., Japanese Patent Application Laid-Open (JP-A) No. 60-200235). Moreover, the electrochemical redox behavior and the electrochromism of a film formed on a transparent electrode by spin coating a tetrahydrofuran (THF) solution of a polyester compound having a TCNQ skeleton have been reported (e.g., G. Inzelt, R. W. Day, J. F. Kinstle, J. Q. Chambers, J. Phys. Chem. 87, 4592-4598 (1983) and G. Inzelt, R. W. Day, J. F. Kinstle, J. Q. Chambers, J. Electroanal. Chem., 161, 147-161 (1984)). However, since the polyester having the TCNQ skeleton has low solubility in a solvent, a coating film containing active ingredients in a sufficient concentration cannot be formed by spin coat application and the function as an electrochromic material is insufficient.

As the color tone variable material, an electrochromism material in a near-infrared region is also useful from the viewpoint of heat insulation effects or recording of invisible information. An electrochromic coloring material of tungsten oxide has absorption in the near-infrared region but has the same problem as above in that the film formation method is limited to a vapor phase method. Thus, the application of the electrochromic coloring material of tungsten oxide to flexible materials has been difficult. In contrast, the electrochromism of a spin coat film of a polymer having a pendant anthraquinone imide skeleton has been reported in recent years (e.g., Y. Zheng, J. Zheng, L. Dou, W. Qiao, X. Wan, J. Mater. Chem. 19-8470 (2009)). However, since the compound is more difficult to reduce than TCNQ, there is a problem in that a drive voltage is higher than that of the electrochromic element using a TCNQ derivative.

Thus, in order to produce a flexible color tone variable film using an electrochromic coloring material, a uniform film containing a sufficient amount of the electrochromic coloring material even in the case of a thin film needs to be formed by an application method instead of a vapor phase method, and such a technique has been desired.

Thus, by obtaining a flexible color tone variable film, application to various fields, such as an electrochromic element, can be achieved by selecting the type or amount of a color tone variable compound to be blended in the color tone variable film.

SUMMARY OF THE INVENTION

According to an aspect of the invention, a color tone variable film which is formed by a reaction of a cationic polymer containing a structural unit containing a positive ionic group in a side chain and a compound containing an acid group and a partial structure which can change color tone as a result of energy application, which can be formed by a wet method, which has flexibility and strength in practical use, and which changes color tone with high sensitivity as a result of energy application, a simple manufacturing method thereof, and an electrochromic element obtained by the manufacturing method, are provided.

Technical Problem

It is an aim of the invention, considering the problems described above, to provide a color tone variable film that can be formed by a wet method instead of a vapor phase method, that has flexibility and strength in practical use, and that changes color tone with high sensitivity by energy application and a novel compound suitable for the color tone variable film.

It is another aim of the invention to provide a method for manufacturing a color tone variable film that can simply manufacture a color tone variable film that is flexible and changes color tone with high sensitivity by energy application instead of a vapor phase method and an electrochromic element obtained by the manufacturing method.

Solution to Problem

The present inventors have conducted extensive research in view of the aims described above. As a result, the present inventors have found that when an aqueous solution of a color tone variable compound having an acid group is mixed with an aqueous solution of a cationic polymer, a poorly soluble ion complex is generated and a partial structure having a color tone variable function in the reaction product is in a neutral state with no electric charges, and that, by contacting the two of these in the shape of a layer and reacting them at a liquid-liquid interface when reacting the two, a poorly soluble self-supporting ion complex film is formed, whereby the invention has been accomplished.

More specifically, exemplary embodiments according to the aspect of the invention include, but are not limited to the following items <1> to <15>.

<1> A color tone variable film formed through a reaction between a cationic polymer including a structural unit containing a positive ionic group in a side chain and a compound containing an acid group and a partial structure that changes color tone as a result of energy application.

<2> The color tone variable film according to the item <1>, wherein the cationic polymer includes at least one selected from the group consisting of structural units represented by the following Formulae (1) to (3):

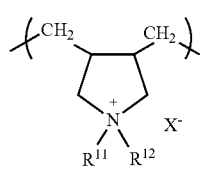

Formula (1)

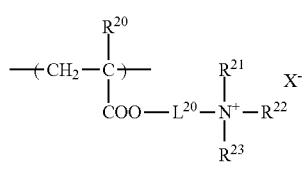

Formula (2)

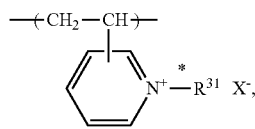

Formula (3)

wherein, in Formula (1), each of $R^{11}$ and $R^{12}$ independently represents an alkyl group or an aryl group; in Formula (2), $R^{20}$ represents a hydrogen atom or an alkyl group; each of $R^{21}$ to $R^{23}$ independently represents a hydrogen atom, an alkyl group, an aralkyl group or an aryl group; and $L^{20}$ represents a divalent linking group; in Formula (3), $R^{31}$ represents an alkyl group; and a connecting position of the pyridine ring group to the main chain is 2-position, 3-position, or 4-position; and each $X^-$ in Formulae (1) to (3) independently represents a counter ion.

<3> The color tone variable film according to the item <1> or the item <2>, wherein the cationic polymer further includes a polymerizable group or a crosslinking group.

<4> The color tone variable film according to any one of the items <1> to <4>, wherein the compound containing an acid group and a partial structure that changes color tone as a result of energy application is a compound represented by the following Formula (I):

$$G\text{-}(L^I\text{-}A)_n \qquad \text{Formula (I)}$$

wherein, in Formula (I), G represents a color tone variable compound residue, $L^I$ represents a divalent linking group, A represents an acid group, and n represents an integer of 1 to 8.

<5> The color tone variable film according to the item <4>, wherein G in Formula (I) is a residue derived from an electrochromic coloring material, a photochromic coloring material, a solvatochromic coloring material, a thermochromic coloring material, a piezochromic coloring material, or a halochromic coloring material.

<6> The color tone variable film according to the item <4> or the item <5>, wherein a compound from which the residue represented by G in Formula (I) is derived is selected from the group consisting of tetracyanoquinodimethanes, diarylethenes, spiropyrans, spiroperimidines, and viologens.

<7> The color tone variable film according to any one of the items <4> to <6>, wherein the acid group represented by A in Formula (I) is selected from the group consisting of a carboxylic acid group, a sulfonic acid group and a phosphonic acid group.

<8> The color tone variable film according to any one of the items <1> to <7>, wherein the compound containing an acid group and a partial structure that changes color tone as a result of energy application is a compound including a plurality of acid groups in a molecule.

<9> The color tone variable film according to any one of the items <1> to <8>, wherein the compound containing an acid group and a partial structure that changes color tone as a result of energy application is a tetracyanoquinodimethane derivative including a carboxylic acid group, a sulfonic acid group or a phosphonic acid group in a molecule.

<10> The color tone variable film according to any one of the items <4> to <7>, wherein the compound represented by Formula (I) is a compound represented by the following Formula (III):

Formula (III):

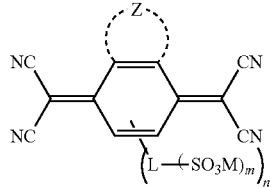

wherein, in Formula (III), Z represents a non metallic atomic group which constitutes a five- or six-membered ring group with two adjacent carbon atoms: L represents a divalent (when m is 1) or trivalent (when m is 2) linking group selected from the group constituting of an arylene group, an alkylene group, —O—, —OC═O—, —C═O—, —NRC═O—, —NRSO$_2$—, and a linking group formed with a combination of two or more thereof; R represents a hydrogen atom or a lower alkyl group having 1 to 3 carbon atoms; M represents a hydrogen atom or a positive ion having a low molecular weight; n represents an integer of 2 to 4; and m represents an integer of 1 or 2.

<11> A method of producing the color tone variable film according to any one of the items <1> to <10>, including, in the following order: (A) forming a layer including a cationic polymer containing a structural unit containing a positive ionic (cationic) group in a side chain, and an aqueous solvent; (B) contacting an aqueous solvent solution of a compound containing an acid group and a partial structure that changes color tone as a result of energy application to a surface of the layer including the cationic polymer and the aqueous solvent; and (C) forming an insoluble color tone variable film via reaction at a liquid-liquid interface between the cationic polymer and the compound containing an acid group and a partial structure that changes color tone as a result of energy application.

<12> The method of producing the color tone variable film according to the item <11>, further including (D) adhering the formed insoluble color tone variable film to a support after the process (C).

<13> The method of producing the color tone variable film according to the item <12>, wherein the support is an electrode and the color tone variable film includes a residue derived from an electrochromic coloring material.

<14> An electrochromic element formed by using the method of producing the color tone variable film according to the item <13>.

<15> A salt of a tetracyanoquinodimethane derivative including a carboxylic acid group, a sulfonic acid group or a phosphonic acid group in a molecule, and a polyvalent cation polymer.

BRIEF DESCRIPTION OF DRAWINGS

Exemplary embodiments of the present invention will be described in detail based on the following figures, wherein.

DESCRIPTION OF EMBODIMENTS

Figure 1:
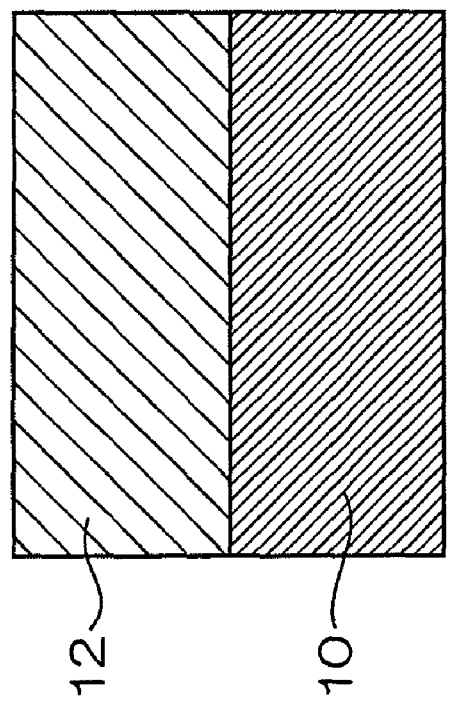
FIG. 1 is an outline cross sectional view illustrating one embodiment of a method for manufacturing a color tone variable film in the invention.
Figure 1:
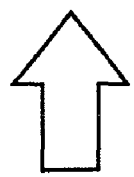
Figure 1:
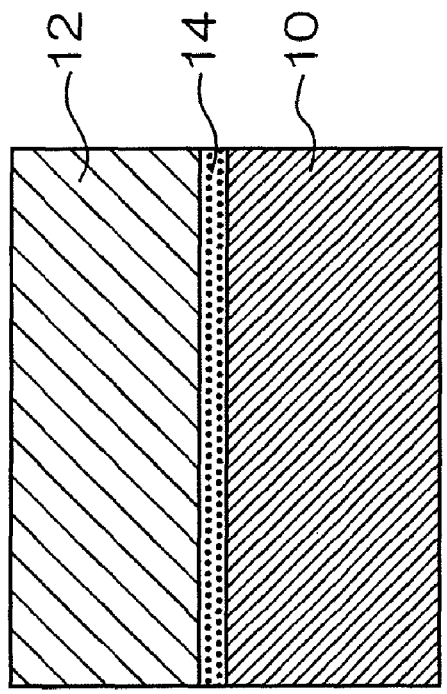

Hereinafter, the invention will be described in detail.

<Color Tone Variable Film and Method for Manufacturing the Same>

The color tone variable film of the invention is formed by a wet method by contacting an aqueous solvent solution of a cationic polymer containing a structural unit containing a positive ionic (cationic) group in the side chain and an aqueous solvent solution of a compound containing an acid group and a partial structure that changes color tone as a result of energy application (hereinafter referred to as a color tone variable compound as appropriate), and reacting them on the liquid-liquid surface.

This reaction is a salt formation reaction by the ion exchange reaction of the positive ionic group in the cationic polymer and the acid group of the color tone variable compound. As a result, a self-supporting flexible film is formed by the ionic interaction on the liquid-liquid interface, and the formed film contains a compound that changes color tone as a result of energy application.

The color tone variable film of the invention is used for various uses depending on the color tone variable compound to be used and can be utilized as a display element of an electrochromic display or the like, a concentration variable shading material, a color tone variable color filter, a color tone variable ornament film, and the like.

Hereinafter, the details of such a color tone variable film will be described with the raw materials and a manufacturing method having excellent productivity.

[Cationic Polymer Containing Structural Unit Containing Positive Ionic Group in Side Chain]

The cationic polymer containing a structural unit containing a positive ionic group in the side chain usable in the invention is preferably soluble in an aqueous solvent containing water as the main ingredients, i.e., 10% or more soluble at room temperature (25° C.).

As the positive ionic group in the side chain, ammonium or phosphonium is preferable from the viewpoint of film formation properties and from the viewpoint of the stability of the ion complex to generate, one having a quaternary ammonium cationic structure is preferable.

Examples of the structural unit containing a positive ionic group in the side chain suitable for the invention include structural units represented by the following Formulae (1) to (9).

Each substituent and linking group described below may further have a substituent when it can be introduced.

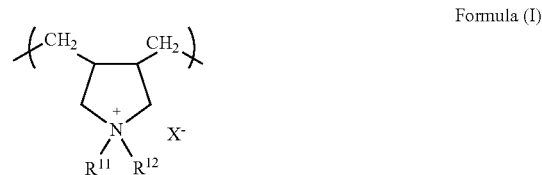

Formula (I)

In Formula (1), each of $R^{11}$ and $R^{12}$ independently represents an alkyl group or an aryl group. A straight chain or branched alkyl group having 1 to 18 carbon atoms is preferable as the alkyl group, and a straight chain alkyl group having 1 to 4 carbon atoms is more preferable. $R^{11}$ and $R^{12}$ may be same as or different from each other. It is preferable that $R^{11}$ and $R^{12}$ is the same as each other, from viewpoint of synthetic adaptability. Specifically, examples of both of $R^{11}$ and $R^{12}$ are preferably methyl groups, ethyl groups, propyl groups and the like.

$X^-$ represents a counter ion. A halogen atom, $SO_4$, $HSO_4$, $PO_4$, $H_2PO_4$, $HPO_4$, $CH_3SO_3$, $CF_3SO_3$, $CH_3C_6H_4SO_3$, $PF_6$, $BF_4$ or the like is preferable, and chlorine atom is more preferable as X.

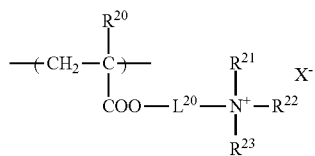

Formula (2)

In Formula (2), $R^{20}$ represents a hydrogen atom, or an alkyl group. Each of $R^{21}$ to $R^{23}$ independently represents a hydrogen atom, an alkyl group, an aralkyl group or an aryl group. $L^{20}$ represents a divalent linking group.

$R^{20}$ includes a hydrogen atom and an alkyl group having 1 to 18 carbon atoms. $R^{20}$ is preferably a hydrogen atom, a methyl group, an ethyl group, or a propyl group, and more preferably a hydrogen atom or a methyl group.

Each of $R^{21}$ to $R^{23}$ independently includes a hydrogen atom, an alkyl group having 1 to 18 carbon atoms, an aryl group having 6 to 18 carbon atoms, and an aralkyl group having 7 to 18 carbon atoms. Each of $R^{21}$ to $R^{23}$ is preferably an alkyl group having 1 to 8 carbon atoms or a benzyl group independently.

Specific examples of compounds represented by Formula (2) include compounds in which $R^{20}$ is a hydrogen atom or a methyl group, and each of $R^{21}$, $R^{22}$ and $R^{23}$ is a group in a combination represented in parentheses described below.

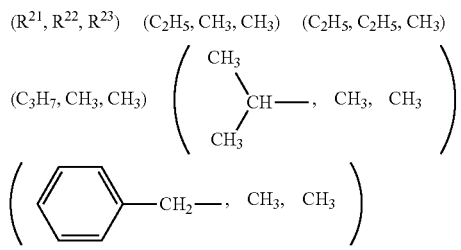

In Formula (2), counter ions represented by $X^-$ preferably include following anions described below.

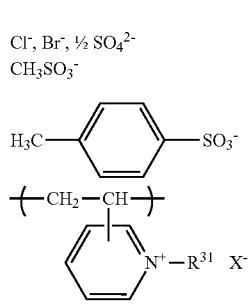

Formula (3)

In Formula (3), $R^{31}$ represents an alkyl group having 1 to 18 carbon atoms or an aralkyl group having 7 to 18 carbon atoms. $R^{31}$ is preferably an alkyl group having 1 to 8 carbon atoms or a benzyl group. $X^-$ represents a counter ion, and has the same definition as that defined in Formula (2). A connecting position of the pyridine ring group to the main chain in Formula (3) is 2-position, 3-position, or 4-position with the pyridine ring, and is preferably 2-position or 4-position.

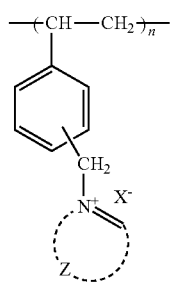 (4)

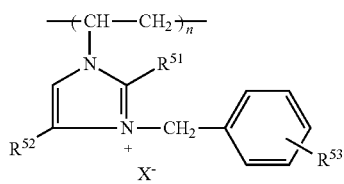 (5)

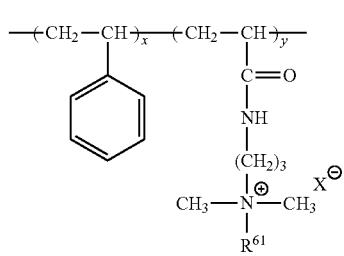 (6)

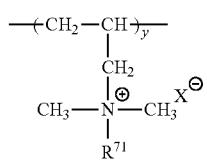 (7)

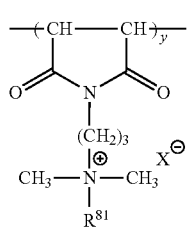 (8)

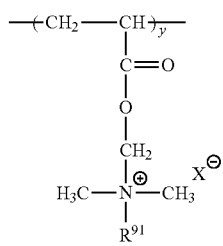 (9)

$R^{61}, R^{71}, R^{81}, R^{91}$:

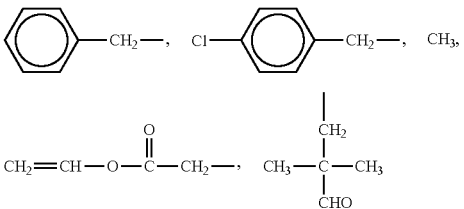

In Formula (4), Z represents a non-metal atomic group which are necessary to form a five- or six-membered heterocyclic group containing at least a nitrogen atom. Each of $R^{51}$ to $R^{53}$ in Formula (5) independently represents a hydrogen atom, a hydroxyl group, an alkyl group, an aralkyl group or an aryl group.

$R^{61}$ in Formula (6), $R^{71}$ in Formula (7), $R^{81}$ in Formula (8) and $R^{91}$ in Formula (9) each independently represent a group selected from the five groups described above (that is a benzyl group, a p-chlorobenzyl group, a methyl group, a vinyloxycarbonylmethyl group, and 2,2-dimethyl-3-oxopropyl group).

Each of $X^-$ in Formula (4) to Formula (9) independently represents a counter ion, and has the same definition as that defined in Formula (2).

A content of a structural unit containing a cationic group in the cationic polymer is preferably in a range of from 20% by mole to 100% by mole.

Further, a weight average molecular weight of the cationic polymer is preferably in a range of from 100,000 to 1,000,000, and more preferably in a range of from 200,000 to 500,000.

When a cationic polymer according to the present invention includes a structural unit other than the structural unit containing a cationic group, preferable examples of the structural unit include the following structural unit: —(CH$_2$CH$_2$)—, —(CH$_2$CH(CH$_3$))—, —(CH$_2$CHCOOCH$_3$)—, —(CH$_2$C(CH$_3$)COOCH$_3$)—, a structural unit in which $R^{23}$ and X are eliminated from the structural unit represented by Formula (2) (that is a structural unit containing a neutral amino group), a structural unit in which $R^{31}$ and X are eliminated from the structural unit represented by Formula (3), and similar structural units containing a neutral amino group each corresponding to structural units represented by Formula (5) to Formula (9) (that is, a structural unit in which a benzyl group substituted with $R^{53}$ and X are eliminated from the structural unit represented by Formula (5), structural units in which $R^{61}$, $R^{71}$, $R^{81}$ and $R^{61}$ and X are respectively eliminated from the structural units represented by Formula (6) to Formula (9)). Specific examples of the cationic polymers described above, which are within a scope of the formula of the invention is listed in the followings, but the invention is not limited thereto.

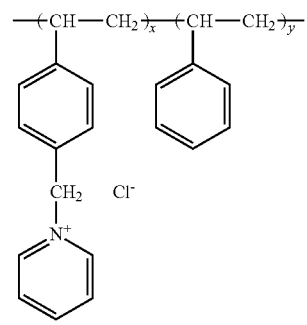

I-2

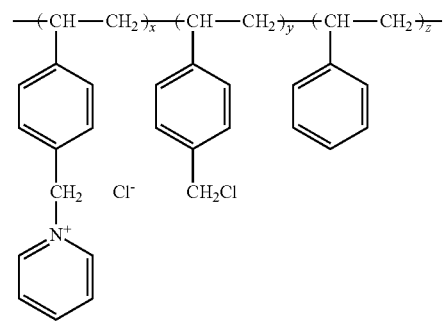

I-3

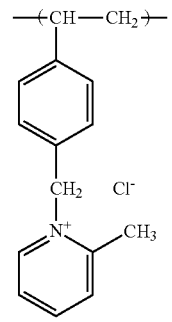

I-4

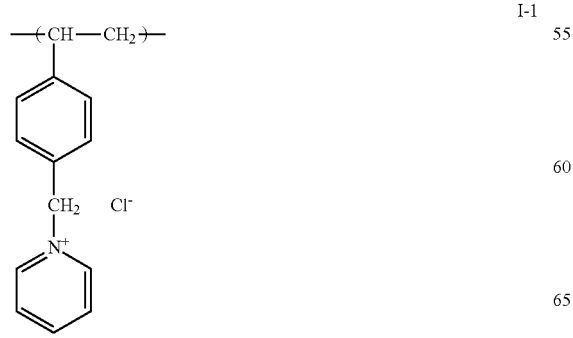

I-1

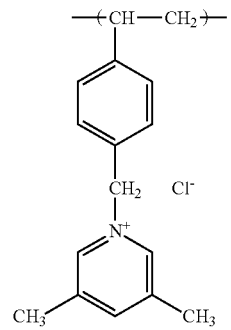

I-5

I-6
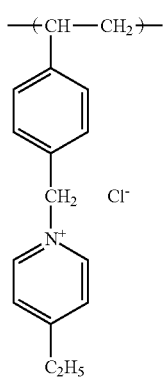
I-7
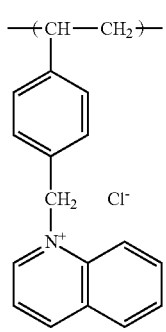
I-8
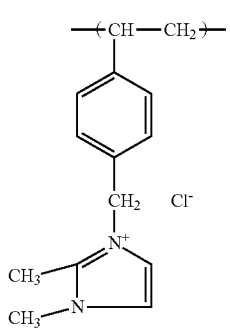
I-9
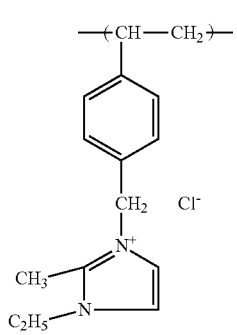
I-10
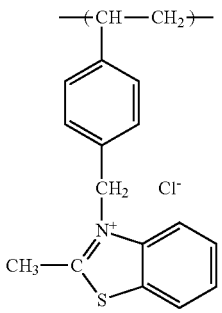
II-1
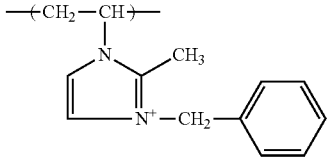
II-2
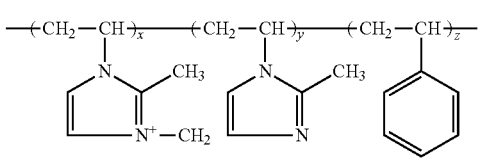
x/y/z = 20/30/50
II-3
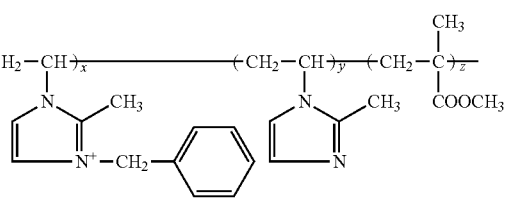
x/y/z = 30/30/40
II-4
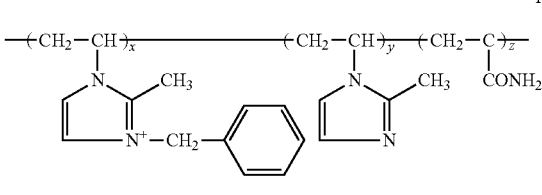
x/y/z = 40/40/20
II-5
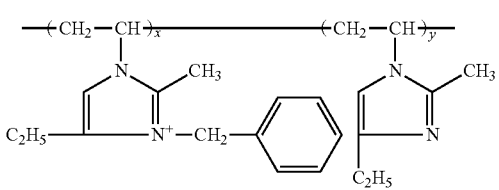
x/y = 30/70

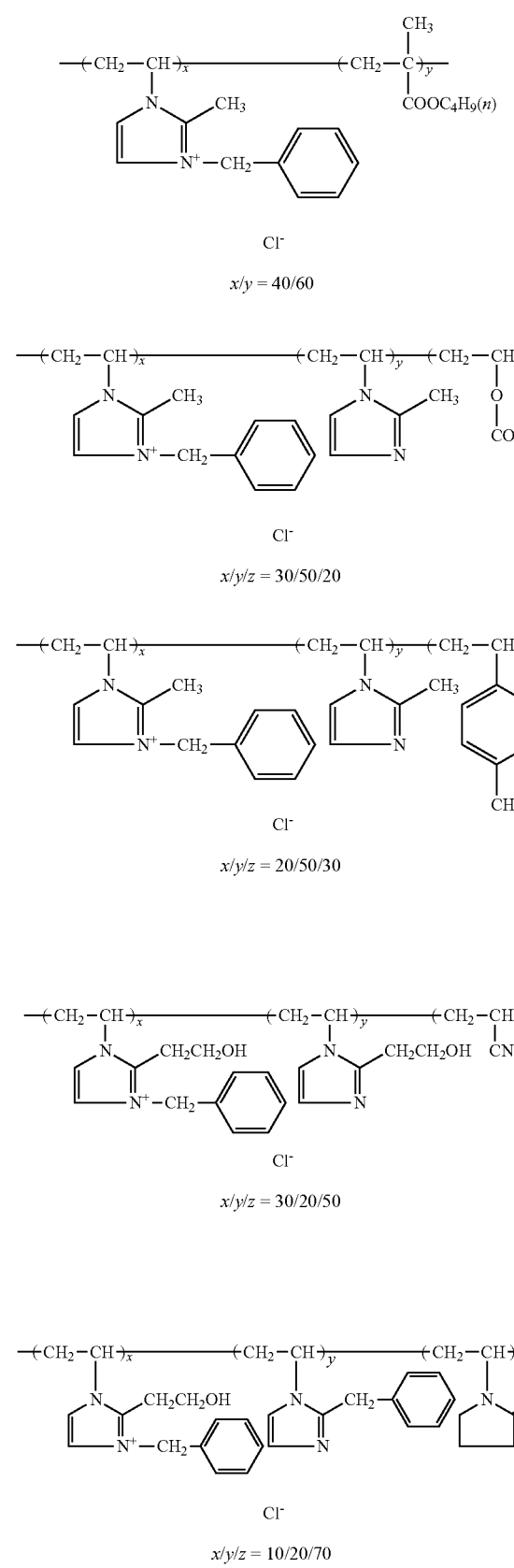
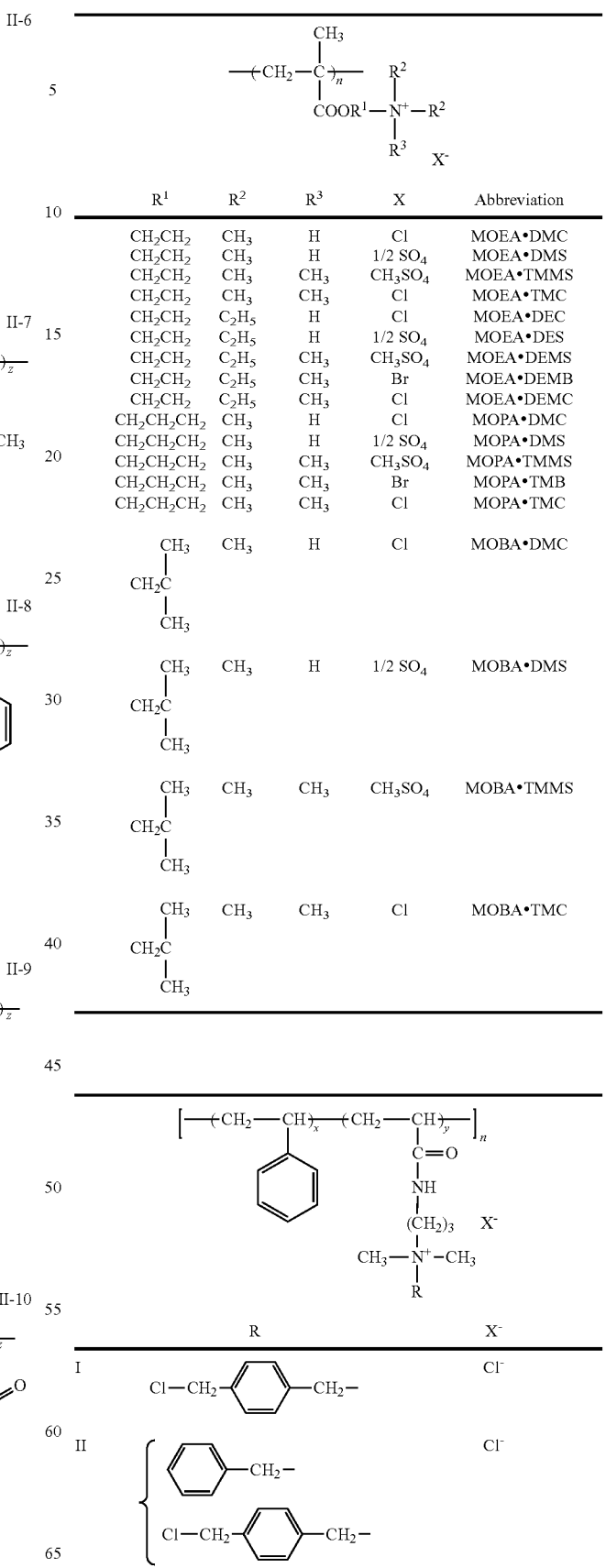

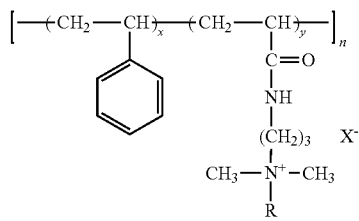
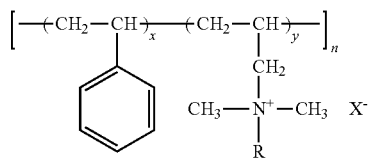
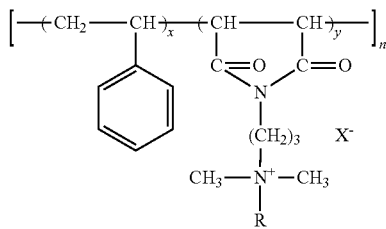

-continued
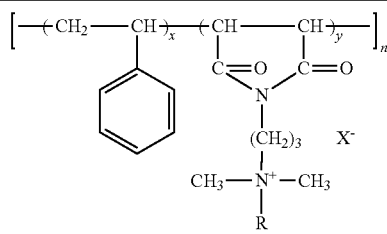
| | R | X⁻ |
|---|---|---|
| XIII | benzyl; 4-(chloromethyl)benzyl | Cl⁻ |
| XIV | CH₃—; 4-(chloromethyl)benzyl | 4-sulfonatobenzyl, Cl⁻ |
| XV | —(CH₂)₃—CHO | Cl⁻ |
| XVI | CH₃— | 4-methylbenzenesulfonate |
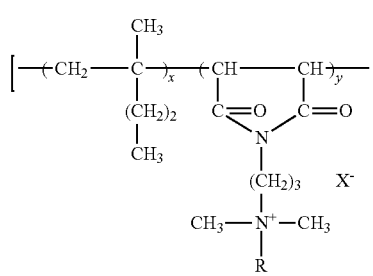
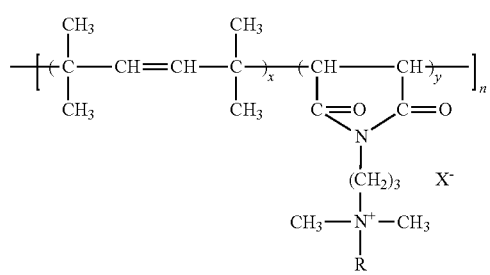
| | R | X⁻ |
|---|---|---|
| XVII |  | Cl⁻ |
| XVIII |  | Cl⁻ |

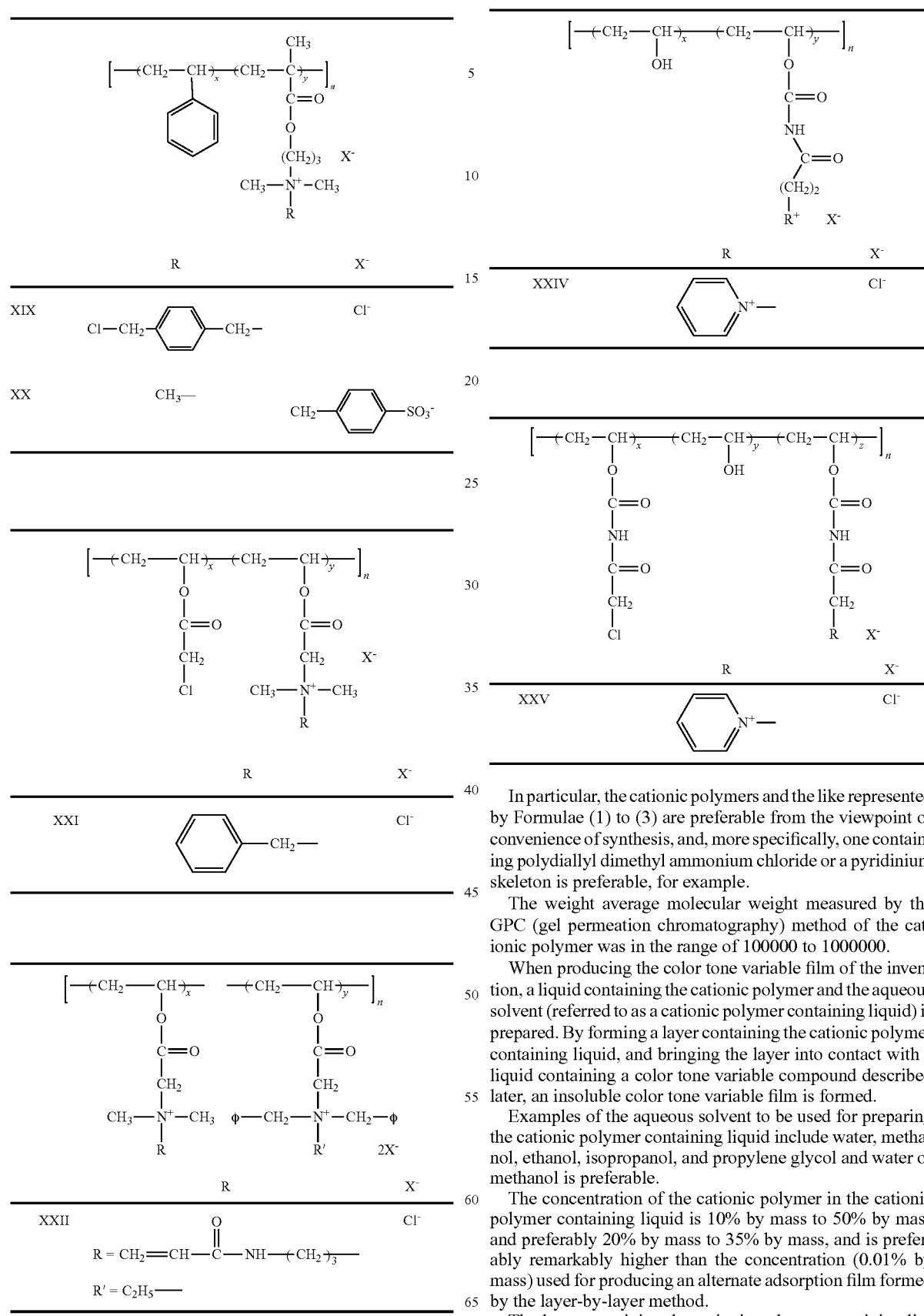

In particular, the cationic polymers and the like represented by Formulae (1) to (3) are preferable from the viewpoint of convenience of synthesis, and, more specifically, one containing polydiallyl dimethyl ammonium chloride or a pyridinium skeleton is preferable, for example.

The weight average molecular weight measured by the GPC (gel permeation chromatography) method of the cationic polymer was in the range of 100000 to 1000000.

When producing the color tone variable film of the invention, a liquid containing the cationic polymer and the aqueous solvent (referred to as a cationic polymer containing liquid) is prepared. By forming a layer containing the cationic polymer containing liquid, and bringing the layer into contact with a liquid containing a color tone variable compound described later, an insoluble color tone variable film is formed.

Examples of the aqueous solvent to be used for preparing the cationic polymer containing liquid include water, methanol, ethanol, isopropanol, and propylene glycol and water or methanol is preferable.

The concentration of the cationic polymer in the cationic polymer containing liquid is 10% by mass to 50% by mass and preferably 20% by mass to 35% by mass, and is preferably remarkably higher than the concentration (0.01% by mass) used for producing an alternate adsorption film formed by the layer-by-layer method.

The layer containing the cationic polymer containing liquid is formed by any method. Examples include a method for applying the cationic polymer containing liquid to a temporary support, and forming a coating film and a method for charging the cationic polymer containing liquid in a plate-like container. The application method is preferable from the viewpoint of convenience of operation.

When the fluidity of the liquid is high in forming the liquid layer, there is a concern that a uniform reaction on the liquid-liquid interface is inhibited. Thus, the viscosity of the cationic polymer containing liquid at 25° C. is preferably in the range of 50 mPa·s to 1500 mPa·s, more preferably 60 mPa·s to 1200 mPa·s, and particularly preferably 250 mPa·s to 1000 mPa·s.

A thickening agent may be blended in a coating liquid for adjusting the viscosity. As the thickening agent, a cationic or nonionic thickening agent is preferably selected and used in order not to be combined to the cationic polymer.

Examples of the thickening agent usable in the invention include the following thickening agents:

Polyethylene oxide/non-ionic water-soluble resin,

Carboxy vinyl polymer/crosslinked acrylic water-soluble resin,

Partially neutralized polyacrylate,

Hydroxyethylcellulose/water-soluble thickening agent,

Cellulose and a derivative thereof, CMC, MC, and the like,

Protein, such as albumin (egg white ingredients) or casein (contained in milk),

Alginic acid, agar, starch, polysaccharide, xanthan gum,

Vinyl and vinylidene compounds and synthetic polymer compounds containing a combination thereof, Polyester compound, Polyamide compound, Polyether compound, Polyglycol compound, Polyvinyl alcohol compound, Polyalkylene oxide compound, Polyacrylic acid compound, and Dimethyl distearyl ammonium hectorite/quaternium-18hectorite.

By adding the thickening agents above, the viscosity may be adjusted to the preferable viscosity mentioned above.

[Compound Containing Partial Structure that can Change Color Tone by Energy Application and Acid Group (Color Tone Variable Compound)]

The compound containing an acid group and a partial structure that can change color tone as a result of energy application usable in the invention is preferably the compound represented by the following Formula (I).

$$G\text{-}(L^I\text{-}A)_n \qquad \text{Formula (I)}$$

In Formula (I) above, G represents a color tone variable compound residue, $L^I$ represents a divalent linking group, and A represents an acid group. n represents an integer of 1 to 8.

Here, the color tone variable compound residue represented by G is not particularly limited insofar as it is a residue of a compound that changes color tone as a result of energy application, such as heat application or light application. Examples include an electrochromic coloring material, a photochromic coloring material, a solvatochromic coloring material, a thermochromic coloring material, a piezochromic coloring material, or a halochromic coloring material. From the viewpoint of wide application range, residues of an electrochromic coloring material, a photochromic coloring material, and a thermochromic coloring material, are preferable.

Examples of the acid group represented by A in Formula (I), include, for example, a carboxylic acid group, a sulfonic acid group, a phosphonic acid group and the like.

In Formula (I), n represents an integer of 1 to 8 and is preferably an integer of 2 to 4.

As a method for obtaining the compound containing an acid group and a partial structure that can change color tone as a result of energy application of the invention by introducing an acid group into the color tone variable compounds, known methods can be utilized. Examples of a method for introducing an acid group, an electrophilic substitution reaction (e.g., sulfonation) of an aromatic ring, a reaction of a halogen-substituted alkyl group and hydrogensulfite, and a reaction of a hydroxyl group and an acid anhydride. A method including introducing a hydroxyl group into the skeleton of the color tone variable compound directly or through a linking group, such as an alkylene group, and reacting the same with an acid anhydride is preferable because the method can be carried out under moderate conditions where the skeleton of the color tone variable compound is hard to destroy.

As a more preferable compound of the color tone variable compound, the compound represented by the following Formula (II) is mentioned.

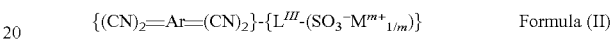

$$\{(CN)_2=Ar=(CN)_2\}\text{-}\{L^{III}\text{-}(SO_3^-M^{m+}{}_{1/m})\} \qquad \text{Formula (II)}$$

In Formula (II), Ar represents a cyclic π conjugate moiety, $L^{III}$ is a divalent linking group and is preferably a linking group containing an allylene group that may contain a substituent or an arylene group that may contain a substituent, and a linking group containing an arylene group is more preferable. In particular, a compound in which —SO₃M is directly bonded to an arylene group is more preferable. The cyclic π conjugate moiety refers to a partial cyclic structure including a pi-conjugated bond.

The alkylene group represented by $L^{III}$ is an alkylene group having 1 to 18 carbon atoms, preferably 2 to 6 carbon atoms, and particularly preferably 2 to 4 carbon atoms. The arylene group represented by $L^{III}$ is preferably a phenylene group or a naphtylene group. The alkylene group or the arylene group may further have a substituent, such as an alkyl group (1 to 8 carbon atoms), an alkoxy group (1 to 6 carbon atoms), an aryloxy group (6 to 18 carbon atoms), and a halogen atom (F, Cl, Br, I). The alkylene group and the arylene group themselves may be a divalent linking group represented by $L^{III}$ or may constitute a divalent linking group by connecting the alkylene group and the arylene group directly or indirectly through an oxygen atom, an ester bond (—C(=O)O—), or sulfonyl bond (—SO₂—). Particularly preferable examples of the linking group represented by $L^{III}$ include a linking group formed by connecting an alkylene group having 2 to 4 carbon atoms and a phenylene group through an ester bond.

M represents a hydrogen atom or a positive ion having a low molecular weight. Preferable examples of the positive ion having a low molecular weight include Na⁺ and Bu₄N⁺, wherein Bu represents a butyl group.

m is an integer of 1 or 2. n represents an integer of 1 to 8, preferably 2 to 4, and particularly preferably 2.

Examples of a particularly preferable compound of the color tone variable compound include the compound represented by the following Formula (III).

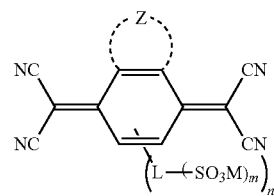

Formula (III)

In Formula (III), Z represents a non metallic atomic group which constitutes a five- or six-membered ring group with two adjacent carbon atoms; L represents a divalent (when m is 1) or trivalent (when m is 2) linking group selected from the group constituting of an arylene group, an alkylene group, —O—, —OC=O—, —C=O—, —NRC=O—, —NRSO$_2$—, and a linking group formed with a combination of two or more thereof; R represents a hydrogen atom or a lower alkyl group having 1 to 3 carbon atoms; n represents an integer of 2 to 4; and m represents an integer of 1 or 2. R is preferably a hydrogen atom, a methyl group, or an ethyl group, and more preferably a hydrogen atom. M represents the same definition as M in Formula (II).

Examples of the color tone variable compound that can form the color tone variable compound residue represented by G are shown below but the invention is not limited thereto.

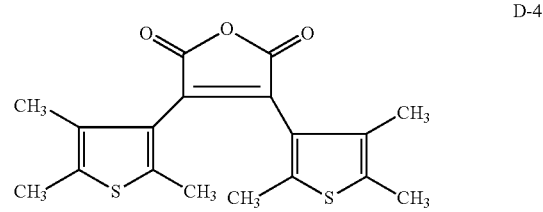

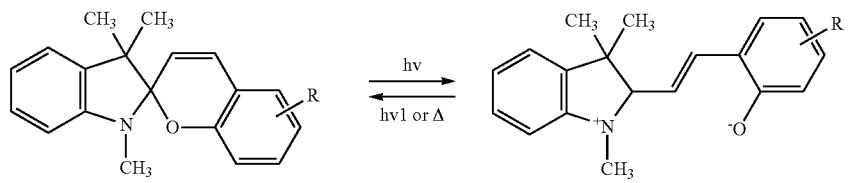

Diarylethenes

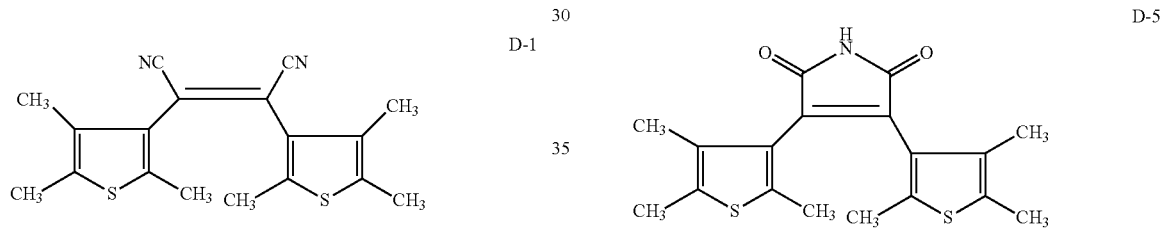

Spiropyrans

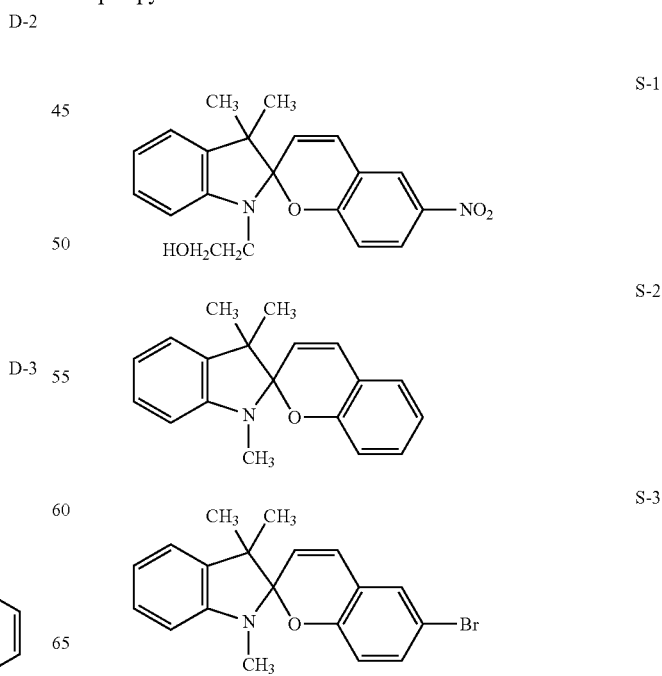

-continued

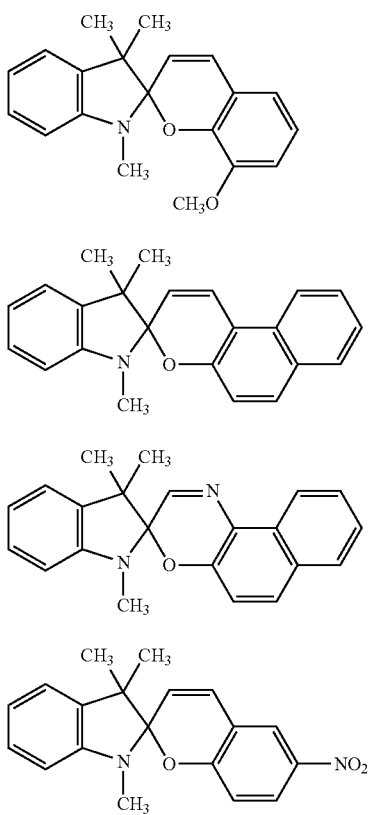

Spiroperimidines

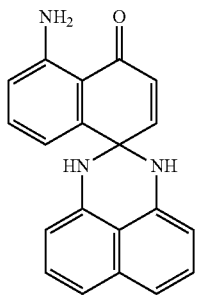

SP-1

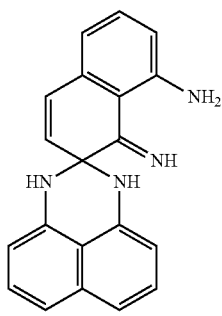

SP-2

Viologens (Related Compounds)

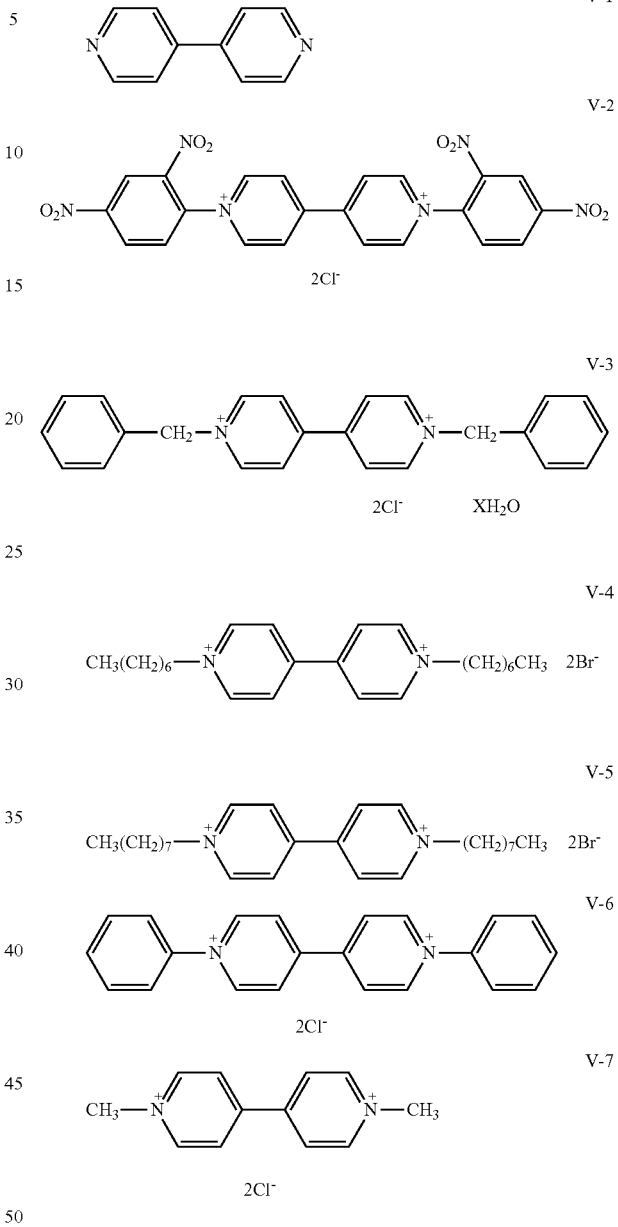

In particular, tetracyanoquinodimethane (TCNQ) is preferable and a compound in which an acid group is connected to this skeleton (TCNQ) through a linking group is preferable. Since two or more acid groups are contained in the skeleton of TCNQ, the cationic polymer chains are crosslinked to thereby increase the strength of the color tone variable film. Thus, containing two or more acid groups in the skeleton of TCNQ is preferable. From such a viewpoint, the number of the acid groups in the skeleton of TCNQ is preferably 2 to 4 in one molecule. As the acid group, a sulfonic acid group is preferable.

Specific examples of a TCNQ derivative having a sulfonic acid group [Exemplified Compound (1) to Exemplified Compound (40)] are shown below but the scope of the invention is not limited only thereto.

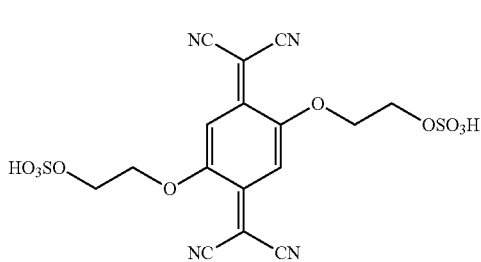(1)
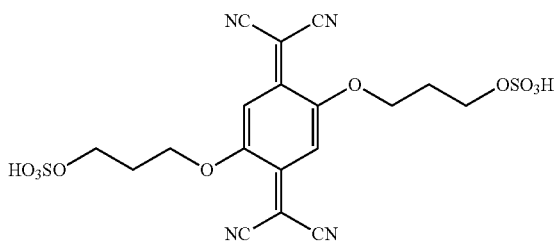(2)
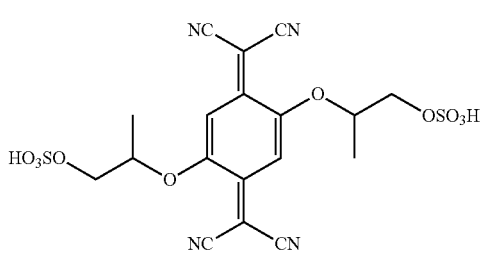(3)
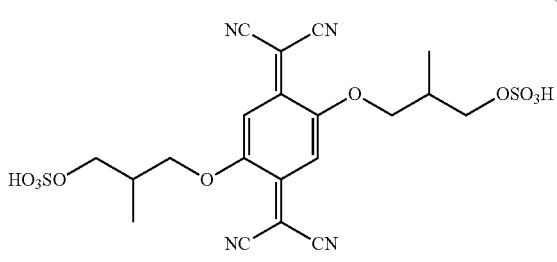(4)
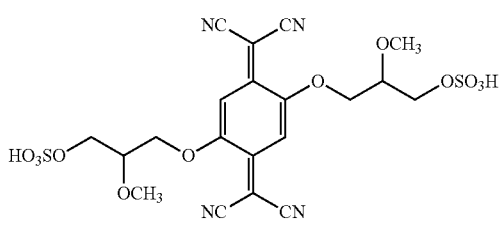(5)
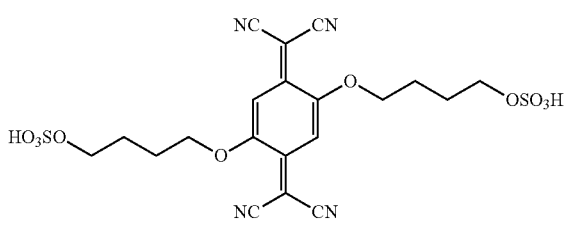(6)
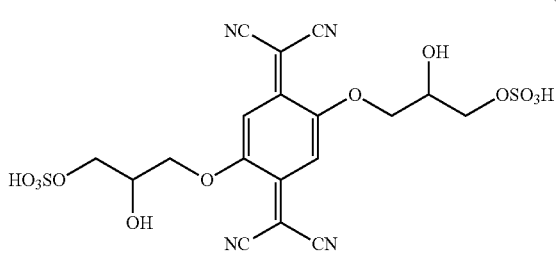(7)
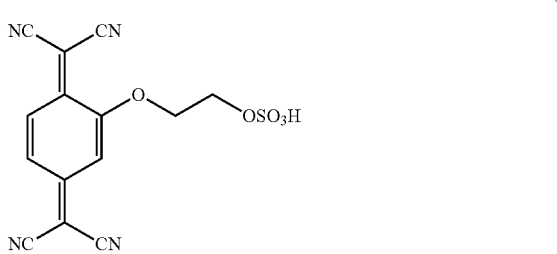(8)
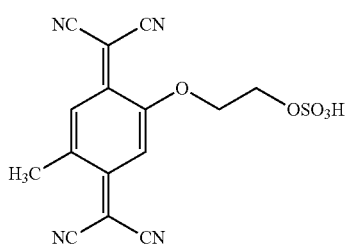(9)
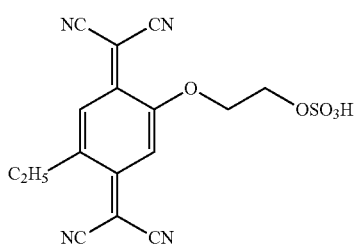(10)
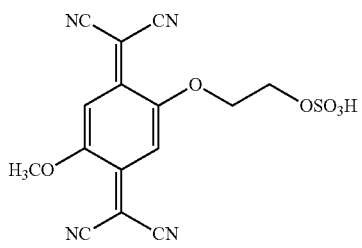(11)
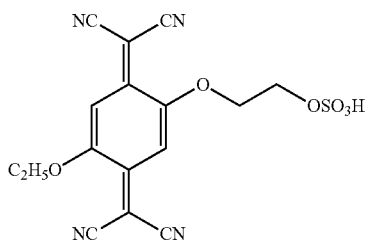(12)

-continued
(13)
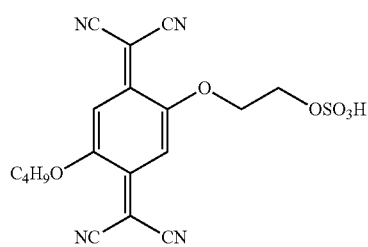
(14)
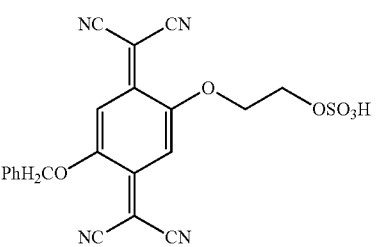
(15)
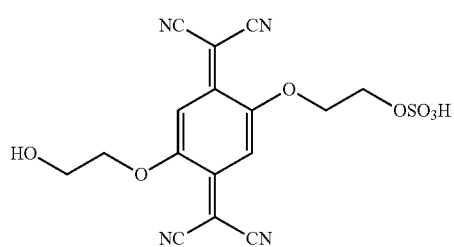
(16)
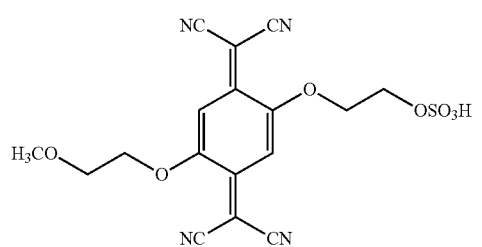
(17)
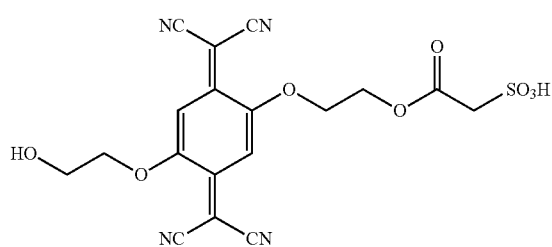
(18)
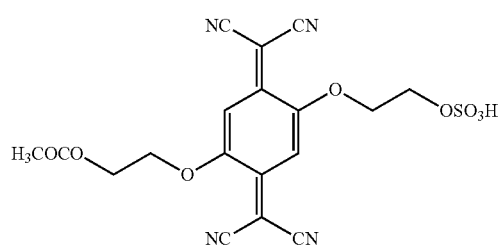
(19)
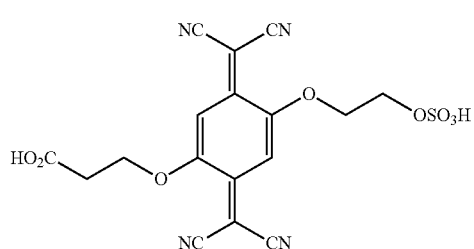
(20)
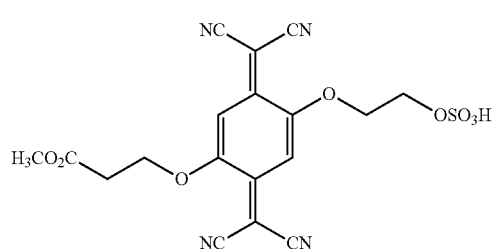
(21)
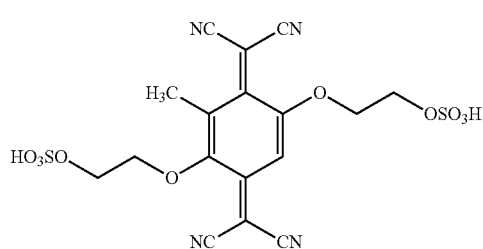
(22)
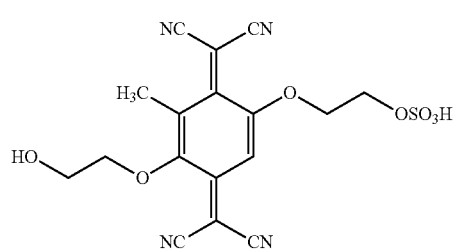
(23)
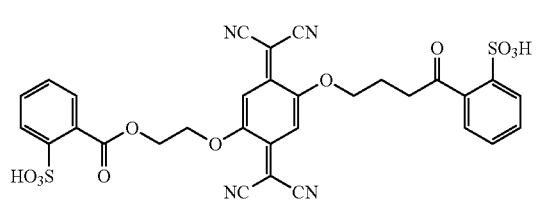 [SMILES: N#CC(C#N)=c1cc(OCCOC(=O)c2ccccc2S(=O)(=O)O)c(=C(C#N)C#N)cc1OCCOC(=O)c1ccccc1S(=O)(=O)O]
(24)
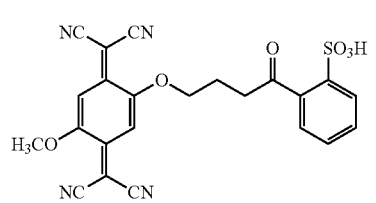

-continued
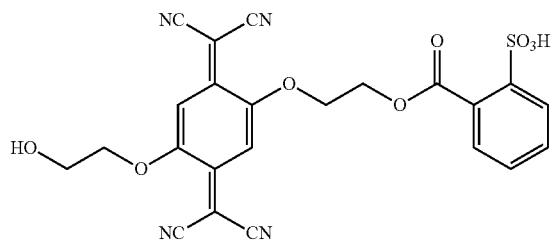
(25)
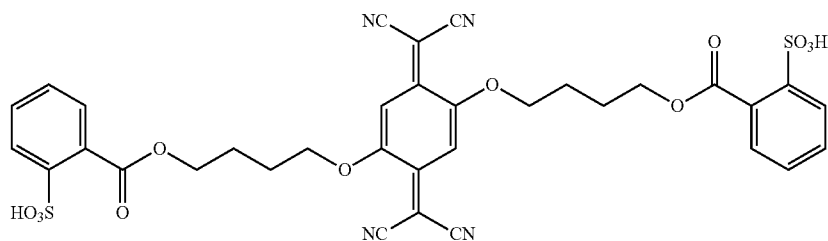
(26)
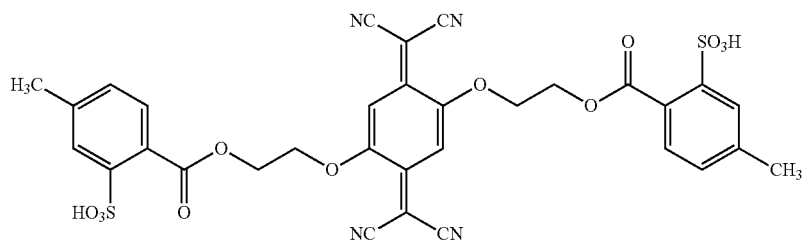
(27)
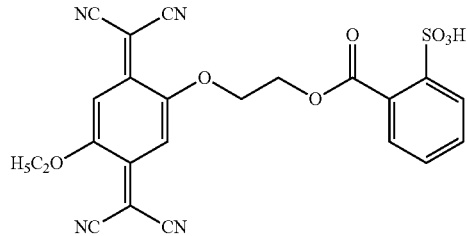
(28)
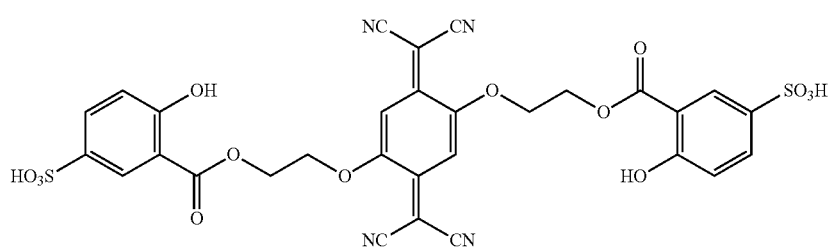
(29)
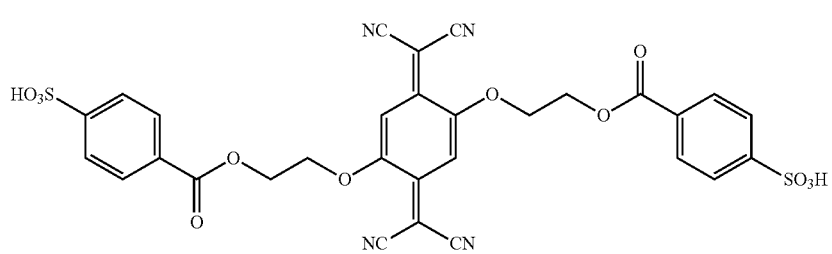
(30)

(31)
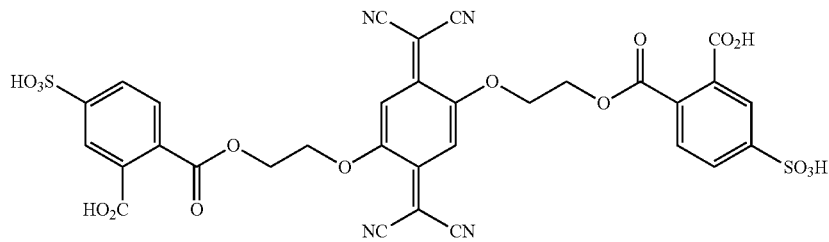
(32)
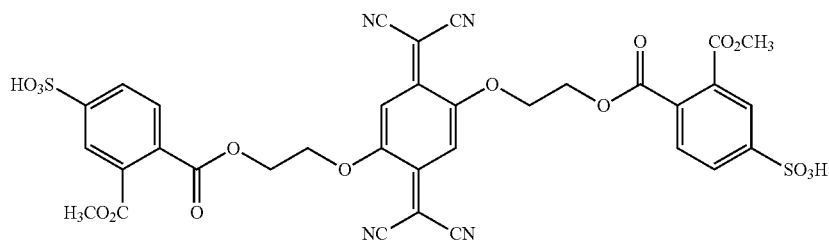
(33)
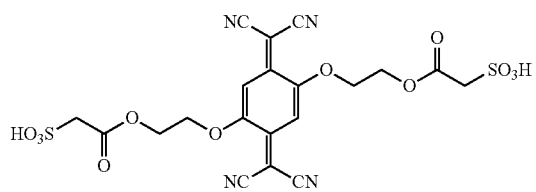
(34)
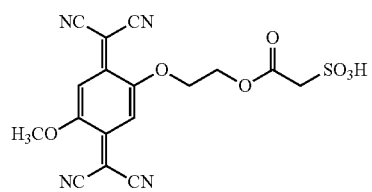
(35)
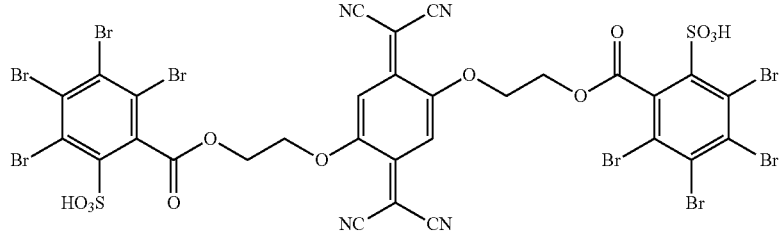
(36)
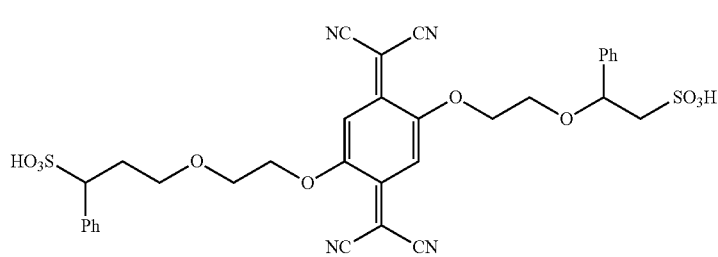
(37)
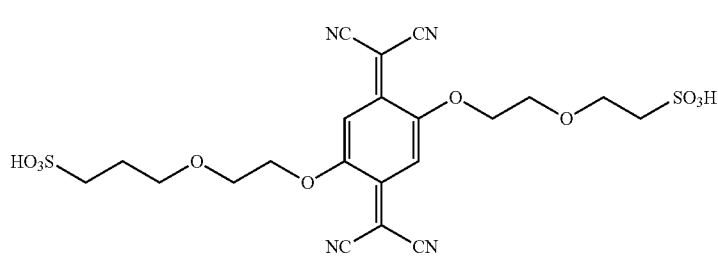

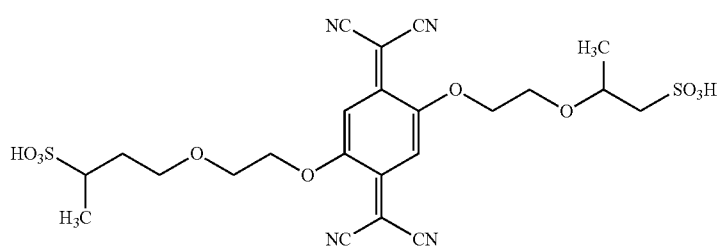

(38)

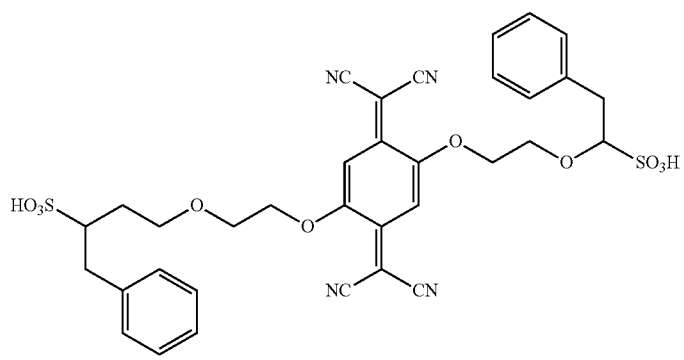

(39)

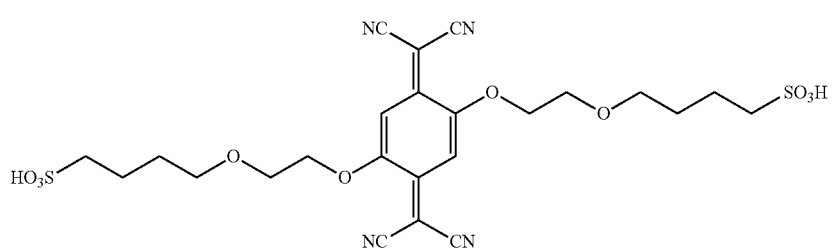

(40)

In order to produce the color tone variable film of the invention, a liquid containing the color tone variable compound and an aqueous solvent (hereinafter referred to as a color tone variable compound containing liquid) is prepared. The aqueous solvent used for the preparation is the same as those mentioned in the description of the cationic polymer containing liquid.

The concentration of the color tone variable compound in the color tone variable compound containing liquid is in the range of 0.1% by mass to 50% by mass, preferably 0.5% by mass to 10% by mass, and particularly preferably 0.5% by mass to 5% by mass in terms of solid content.

Examples of a method for bringing the color tone variable compound containing liquid into contact with a layer containing the cationic polymer containing liquid include, but not particularly limited thereto, a method for applying the color tone variable compound containing liquid to the surface of the cationic polymer containing liquid layer, a method for pouring the color tone variable compound containing liquid to the surface of the cationic polymer containing liquid layer and contacting both of them, and a method for spraying the color tone variable compound containing liquid to the surface of the cationic polymer containing liquid layer. Among the above, the pouring method is preferable from the viewpoints of workability, collection of the formed color tone variable film, and removability of a residual liquid that has become unnecessary.

When the application method is used, the viscosity of the color tone variable compound containing liquid to be used is not particularly limited insofar as the viscosity of the cationic polymer containing liquid is in the range above and the liquid is relatively viscous and is preferably 50 mPa·s to 1500 mPa·s at 25° C. The viscosity of the liquid in the case of using the pouring method is preferably 5 mPa·s to 1000 mPa·s.

When the application method is used, the viscosity may be adjusted using a thickening agent for the color tone variable compound containing liquid. The thickening agent is the same as that used for the preparation of the cationic polymer containing liquid.

FIG. 1 is an outline cross sectional view illustrating the outline of a color tone variable film manufacturing method.

First, a layer 10 containing the cationic polymer containing liquid is formed, and then a layer 12 containing the color tone variable compound containing liquid is formed on the surface of the layer 10. Thereafter, the positive ionic group in the cationic polymer and the acid group in the color tone variable compound react on the liquid-liquid interface of both of them to form an interaction, thereby forming an insoluble color tone variable film 14. This reaction promptly proceeds at room temperature (25° C.).

The reaction temperature is preferably 10° C. to 60° C. and the reaction time is preferably 1 second to 30 minutes.

Figure 2:
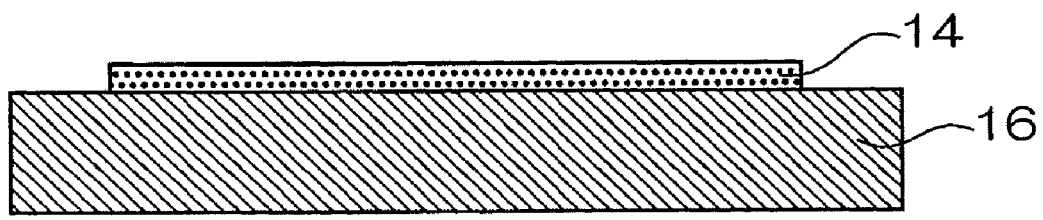
FIG. 2 is an outline cross sectional view illustrating one embodiment of a state where the color tone variable film of the invention is adhered to a support.

The insoluble color tone variable film 14 may be taken out by supplying a lot of water after the formation of the film 14 so that the film 14 comes to the liquid surface, and then taking out the film 14 or may be taken out by adhering the film 14 to a support 16 as illustrated in FIG. 2, and then taking out the same from the liquid surface. The method for adhering the color tone variable film 14 onto the support 16 is preferable from the viewpoint of film protection properties. Moreover, post-treatment, such as a washing with water, can also be performed in a state where the film 14 is adhered onto the support 16.

[Electrochromic Element]

Figure 3:
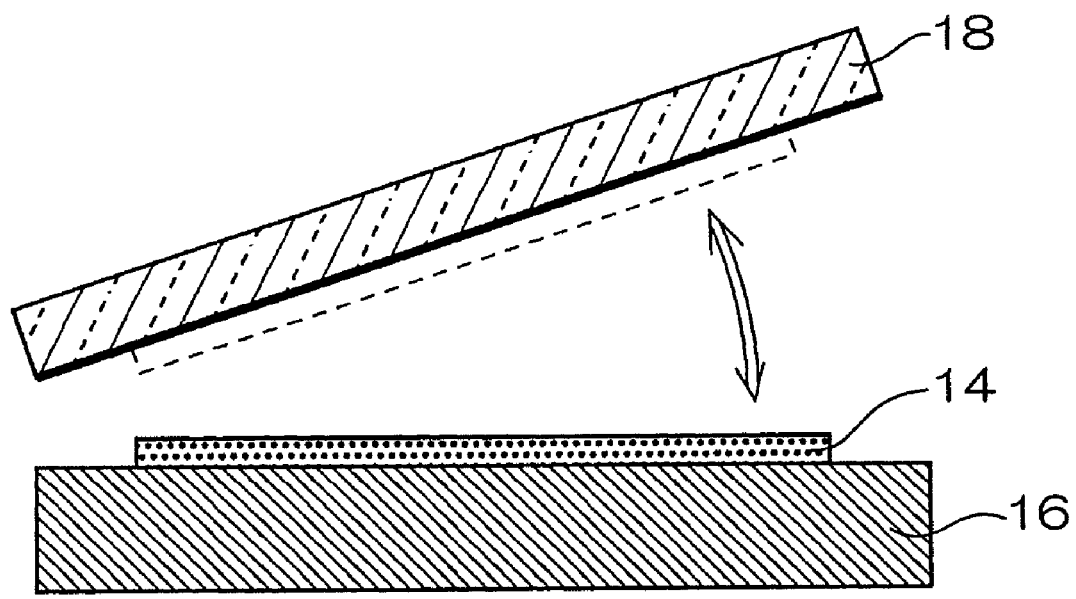
FIG. 3 is an outline cross sectional view illustrating a state where the color tone variable film of FIG. 2 is transferred to a substrate from the support.
Figure 4:
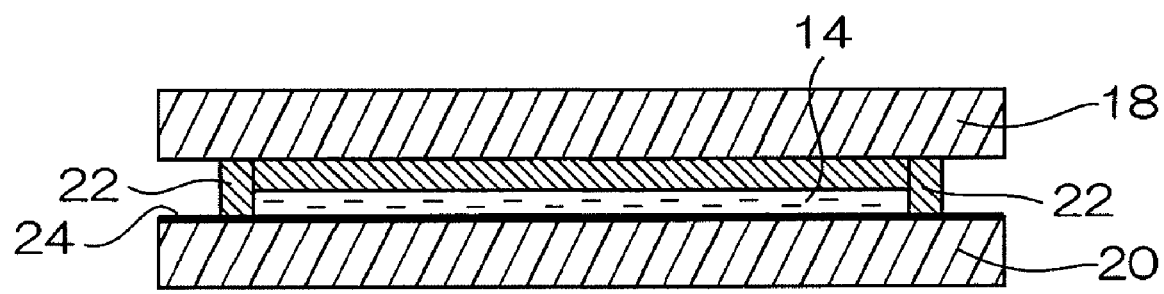
FIG. 4 is a diagram of an electrochromic element formed in Example 1.

When the color tone variable film 14 contains an electrochromic coloring material residue, an electrochromic element having a structure illustrated in FIG. 4 can be formed by transferring the obtained color tone variable film 14 to a glass plate 18 to which ITO (electrode) is vapor-deposited beforehand as illustrated in FIG. 3 and air-drying the same to thereby form a laminate, disposing a glass plate (substrate) 20 having an ITO layer (electrode), which is a counter electrode, through an appropriate spacer 22, and charging an electrolyte 24 in a gap. More specifically, FIG. 4 is an outline cross sectional view illustrating one embodiment of the electrochromic element of the invention. By circulating a current to the electrode of the electrochromic element, the color tone variable film 14 in a cell develops color and when the current is reversed, the color disappears.

More specifically, the electrochromic element has the color tone variable film 14 of the invention and the electrolyte 24 in a cell formed with a pair of the facing electrodes 18 and 20 and the spacer 22 for disposing the electrodes with a space therebetween.

In this electrochromic element, since the film 14 having color tone variability has flexibility, a flexible electrochromic element is easily formed by the use of a flexible material as a cell material and an electrode material.

By selecting the color tone variable compound contained in the color tone variable film 14, a color tone variable element for various uses can be formed by the same simple method and therefore, the application range of the color tone variable compound is wide.

The reaction product of TCNQ having a sulfonic acid group used in the invention and a polyvalent cationic polymer is a novel color tone variable compound.

TCNQ having a sulfonic acid group (Exemplified Compound (23) above) and a 20% aqueous solution of high molecular weight polydiallyl dimethyl ammonium chloride (weight average molecular weight: 400000 to 500000) of Aldrich reagent were mixed and stirred. The generated orange precipitate was collected by filtration and dried. The reaction product (solid) is a color tone variable compound that develops color by current application and loses the color by stopping the current application.

EXAMPLES

The invention will be more specifically described with reference to Examples. The materials, reagents, the amount of substance and the proportion thereof, operation, and the like shown in the following Examples can be varied insofar as they do not deviate from the gist of the invention. Thus, the scope of the invention is not limited to the following specific examples.

Example 1

<1. Formation of Color Tone Variable Film>

2 mL of a 20% aqueous solution of high molecular weight polydiallyl dimethyl ammonium chloride (weight average molecular weight: 400000 to 500,000) of Aldrich reagent [cationic polymer containing liquid] was cast in a glass petri dish, and then 1 mL of an aqueous solution (concentration of 5 mg/mL) of TCNQ having a sulfonic acid group [Exemplified Compound (23) below] [color tone variable compound containing liquid] was poured to the surface. The liquid spread on the surface of a layer containing the cationic polymer containing liquid, and an insoluble color tone variable film 14 was formed on the liquid-liquid interface of both of them.

After 1 minute has passed, when a lot of water was added to dilute both the liquids, the color tone variable film 14 formed on the interface floated in water. Then, the film 14 was collected by covering the same with the glass plate 16, and then washed with water.

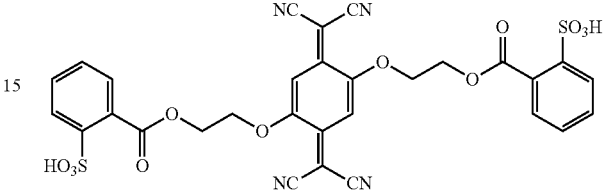

<2. Formation of Electrochromic Element>

The obtained color tone variable film 14 was transferred onto the electrode 18 by putting the glass plate (electrode) 18 to which ITO was vapor-deposited to the surface and shifting as illustrated in FIG. 3. The resultant was washed with water, the remaining cationic polymer containing liquid and the like were removed, and then air-drying was performed. The absorption maximum of the obtained color tone variable film 14 was at 464 nm in the absorbance spectrum, the absorbance at 464 nm was 1.4, and the film thickness was 1.36 μm.

The glass plate 20 having an ITO layer which is a counter electrode was disposed thereto through a 0.1 μm spacer 22, and 0.05 mol of an aqueous sodium sulfate solution 24 as an electrolyte was charged in a gap, thereby structuring an electrochromic cell (electrochromic element) having a structure illustrated in FIG. 4.

By applying a voltage of 0.5 V, the color tone variable film 14 in the cell changed the color from yellow orange to green and the absorbance at 812 nm remarkably increased. By reversing the current, the color disappeared.

Figure 5:
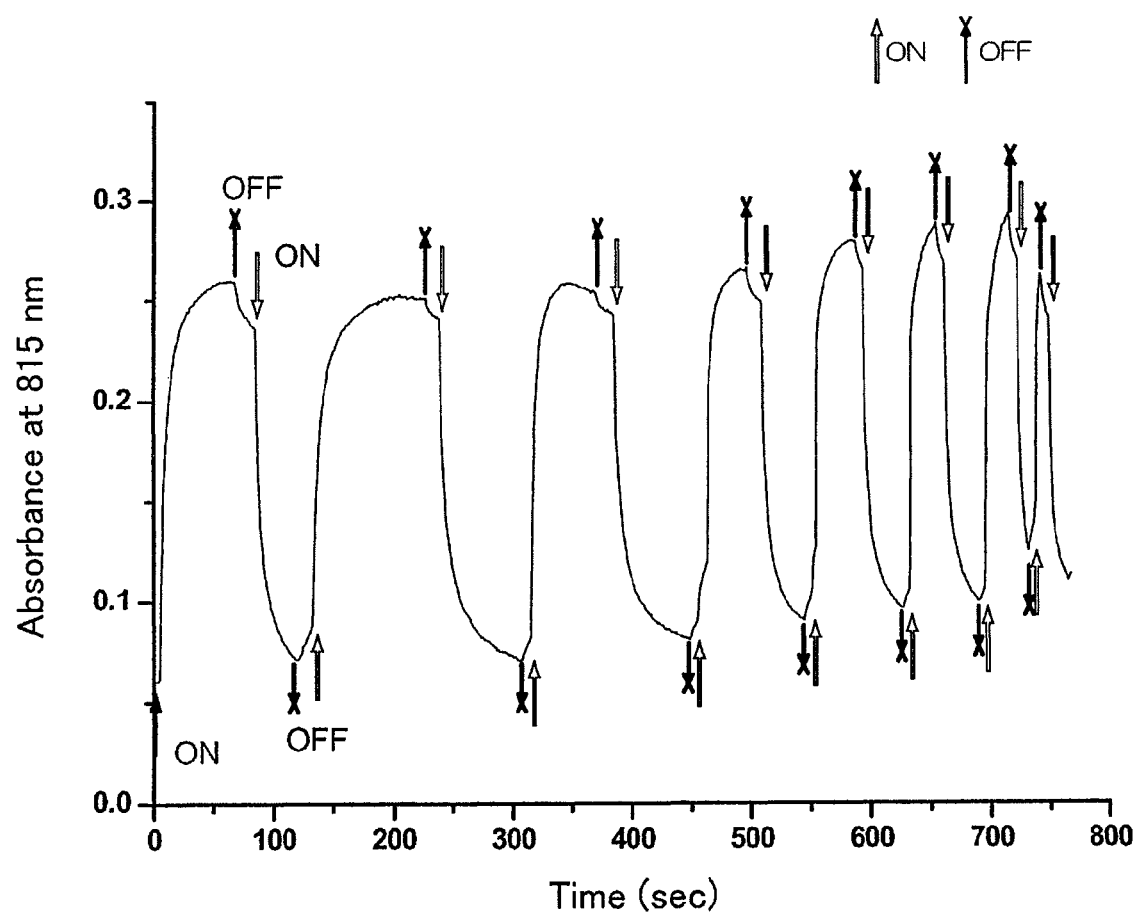
FIG. 5 is a graph illustrating current application to the electrochromic element obtained in Example 1 and color development and disappearance of color.

The state of color development and disappearance of color is illustrated in the graph of FIG. 5.

It was confirmed that an electrochromic element can be simply manufactured by the manufacturing method of the invention. The obtained electrochromic element is a low-voltage driving type and was found to be a film showing the near-infrared electrochromism.

Example 2

An electrochromic element was produced in a manner substantially similar to that in Example 1 except using medium molecular weight polydiallyl dimethyl ammonium chloride (weight average molecular weight: 200000 to 350000) in place of the high molecular weight polydiallyl dimethyl ammonium chloride used in Example 1. By applying a voltage of 0.5 V, the color tone variable film 14 in the cell changed the color from yellow orange to green and the absorbance at 812 nm remarkably increased. By reversing the current, the color disappeared and the repetition of the same color development and disappearance of color as that illustrated in FIG. 5 was observed.

The invention can provide a color tone variable film that can be formed by a wet method instead of a vapor phase method, that has flexibility and strength in practical use, and that changes color tone with high sensitivity as a result of energy application and a novel compound suitable for the color tone variable film.

The invention can also provide a method of manufacturing a color tone variable film that can simply manufacture a color tone variable film that changes color tone with high sensitivity as a result of energy application instead of a vapor phase method and an electrochromic element obtained by the manufacturing method.

The foregoing description of the exemplary embodiments of the present invention has been provided for the purposes of illustration and description. It is not intended to be exhaustive or to limit the invention to the precise forms disclosed. The embodiments were chosen and described in order to best explain the principles of the invention and its practical applications, thereby enabling others skilled in the art to understand the invention for various embodiments and with the various modifications as are suited to the particular use contemplated.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

1. A color tone variable film formed through a reaction between a cationic polymer comprising a structural unit containing a positive ionic group in a side chain and a compound containing an acid group and a partial structure that changes color tone as a result of energy application.

2. The color tone variable film according to claim 1, wherein the cationic polymer comprises at least one selected from the group consisting of structural units represented by the following Formulae (1) to (3):

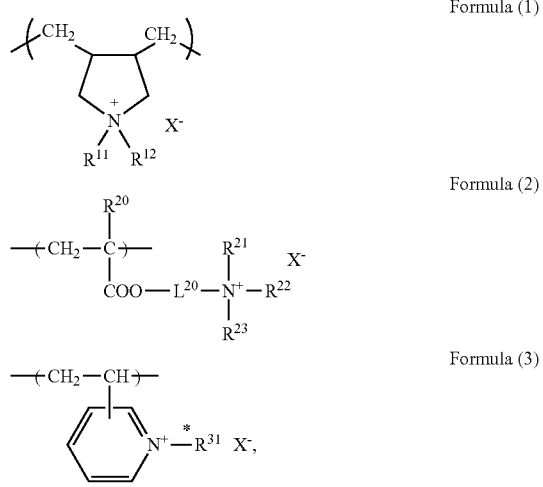

wherein, in Formula (1), each of $R^{11}$ and $R^{12}$ independently represents an alkyl group or an aryl group; in Formula (2), $R^{20}$ represents a hydrogen atom or an alkyl group; each of $R^{21}$ to $R^{23}$ independently represents a hydrogen atom, an alkyl group, an aralkyl group or an aryl group; and $L^{20}$ represents a divalent linking group; in Formula (3), $R^{31}$ represents an alkyl group; and a connecting position of the pyridine ring group to the main chain is 2-position, 3-position, or 4-position; and each $X^-$ in Formulae (1) to (3) independently represents a counter ion.

3. The color tone variable film according to claim 1, wherein the cationic polymer further comprises a polymerizable group or a crosslinking group.

4. The color tone variable film according to claim 1, wherein the compound containing an acid group and a partial structure that changes color tone as a result of energy application is a compound comprising a plurality of acid groups in a molecule.

5. The color tone variable film according to claim 1, wherein the compound containing an acid group and a partial structure that changes color tone as a result of energy application is a tetracyanoquinodimethane derivative comprising a carboxylic acid group, a sulfonic acid group or a phosphonic acid group in a molecule.

6. A method of producing the color tone variable film according to claim 1, comprising, in the following order:
(A) forming a layer comprising a cationic polymer, containing a structural unit containing a positive ionic (cationic) group in a side chain, and an aqueous solvent;
(B) contacting an aqueous solvent solution of a compound containing an acid group and a partial structure that changes color tone as a result of energy application to a surface of the layer comprising the cationic polymer and the aqueous solvent; and
(C) forming an insoluble color tone variable film via reaction at a liquid-liquid interface between the cationic polymer and the compound containing a partial structure that changes color tone by energy application and an acid group by contacting.

7. The method of producing the color tone variable film according to claim 6, further comprising (D) adhering the formed insoluble color tone variable film to a support after the process (C).

8. The method of producing the color tone variable film according to claim 7, wherein the support is an electrode, and the color tone variable film comprises a residue derived from an electrochromic coloring material.

9. An electrochromic element formed by using the method of producing the color tone variable film according to claim 8.

10. The color tone variable film according to claim 1, wherein the compound containing an acid group and a partial structure that changes color tone as a result of energy application is a compound represented by the following Formula (I):

wherein, in Formula (I), G represents a color tone variable compound residue, $L^I$ represents a divalent linking group, A represents an acid group, and n represents an integer of 1 to 8.

11. The color tone variable film according to claim 10, wherein G in Formula (I) is a residue derived from an electrochromic coloring material, a photochromic coloring material, a solvatochromic coloring material, a thermochromic coloring material, a piezochromic coloring material, or a halochromic coloring material.

12. The color tone variable film according to claim 10, wherein a compound from which the residue represented by G in Formula (I) is derived is selected from the group consisting of tetracyanoquinodimethanes, diarylethenes, spiropyrans, spiroperimidines, and viologens.

13. The color tone variable film according to claim 10, wherein the acid group represented by A in Formula (I) is selected from the group consisting of a carboxylic acid group, a sulfonic acid group and a phosphonic acid group.

14. The color tone variable film according to claim 10, wherein the compound represented by Formula (I) is a compound represented by the following Formula (III):

Formula (III):

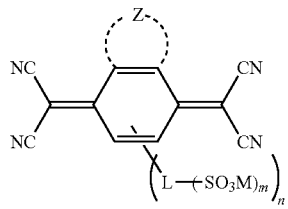

wherein, in Formula (III), Z represents a non metallic atomic group which constitutes a five- or six-membered ring group with two adjacent carbon atoms; L represents a divalent (when m is 1) or trivalent (when m is 2) linking group selected from the group constituting of an arylene group, an alkylene group, —O—, —OC=O—, —C=O—, —NRC=O—, —NRSO$_2$—, and a linking group formed with a combination of two or more thereof; R represents a hydrogen atom or a lower alkyl group having 1 to 3 carbon atoms; M represents a hydrogen atom or a positive ion having a low molecular weight; n represents an integer of 2 to 4; and m represents an integer of 1 or 2.

15. A salt of a tetracyanoquinodimethane derivative comprising a carboxylic acid group, a sulfonic acid group or a phosphonic acid group in a molecule, and a polyvalent cation polymer.

\* \* \* \* \*